Patented Sept. 16, 1941

2,256,189

UNITED STATES PATENT OFFICE 2,256,189

ANTIOXIDANT FOR RUBBER

Max Bögemann, Cologne-Mulheim, Otto Bayer and Rudolf Schröter, Leverkusen, Rhine, and Hans Pohle, Cologne-Mulheim, Germany, assignors, by mesne assignments, to General Aniline & Film Corporation, New York, N. Y., a corporation of Delaware No Drawing. Application October 11, 1938, Serial No. 234,396. In Germany October 12, 1937

3 Claims. (Cl. 260—576)

The present invention relates to new products which represent a new class of valuable antioxidants for rubber.

Our new compounds may be defined by the following formula:

wherein R stands for an aromatic radical such as phenyl, tolyl, xylyl, benzyl, anisyl or naphthyl, and R' stands for a radical of a carbocyclic polymethylene such as cyclopentyl, cyclohexyl, alkylcyclohexyl, arylcyclohexyl or tetrahydronaphthyl.

As follows from the foregoing definition the terms "aromatic radical" and "radical of a carbocyclic polymethylene" are intended to include various substitution products. All these compounds can be prepared in a simple manner by heating a compound of the formula:

with a compound of the formula R'.OH or the corresponding ketone with hydrogen in the presence of a suitable catalyst such as nickel at a high pressure, R and R' having the same meaning as defined above.

In the following there are given details with respect to some compounds which are characteristic of the above class:

(a) N-phenyl-N'-cyclohexyl-p-phenylene diamine

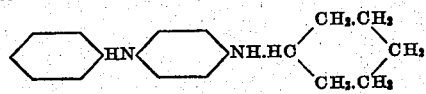

White crystals melting point 118–119°

(b) N-p-tolyl-N'-cyclohexyl-p-phenylene diamine

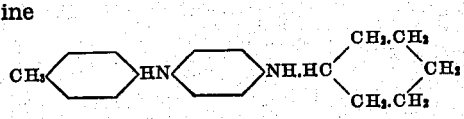

White crystals melting point 98–99°

(c) N-p-methoxyphenyl - N' - cyclohexyl-p-phenylene diamine

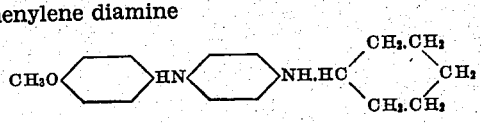

White crystals melting point 95–96°

(d) N-β-naphthyl-N'-cyclohexyl-p-phenylene diamine

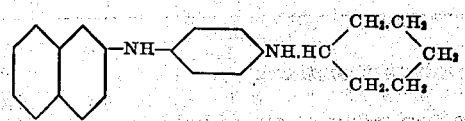

White crystals melting point 143°

Our new compounds represent valuable antioxidants or anti-perishing agents for natural or artificial rubber. When compared with the prior known diarylarylene diamines which appear to be related to our compounds from the chemical point of view, they show the following advantages: Our new compounds have a lower melting point and are better soluble in rubber; consequently, they are much less liable to exude from the composition. They are capable of being easily taken up by rubber and exert an excellent anti-perishing action both towards sun-cracking and mechanical influences.

The following examples illustrate the use of our new products in connection with natural or synthetic rubber and in comparison with prior known anti-perishing agents of a similar type, the parts being by weight:

Example 1

A mixture consisting of

| | Parts |
|---|---|
| Smoked sheets | 250.00 |
| Crepe | 250.00 |
| Titanium oxide | 100.00 |
| Zinc oxide | 50.00 |
| Sulfur | 16.50 |
| Diphenyl guanidine | 6.25 | is divided into 5 parts. One of them (test 1) is vulcanized without the addition of an anti-perishing agent; the remaining four parts are vulcanized with 0.75 part each of phenyl-α-naphthylamine (test 2), a mixture of equal parts of phenyl-α-naphthylamine and diphenyl-p-phenylene diamine (test 3), N-phenyl-N'-cyclohexyl-p-phenylene diamine (test 4) and N-β-naphthyl-N'-cyclohexyl-p-phenylene diamine (test 5).

The following table illustrates the conditions of vulcanization at 3 atmospheres overpressure and the mechanical properties of the vulcanizates obtained, the first number indicating the tensile strength in kgs. per cm² and the second number the elongation in per cent:

| Time of cure | 1 | 2 | 3 | 4 | 5 |
|---|---|---|---|---|---|
| AFTER VULCANIZATION | | | | | |
| 45 minutes | 260/715 | 256/710 | 248/705 | 243/690 | 251/690 |
| 60 minutes | 248/685 | 245/690 | 250/685 | 243/670 | 243/675 |
| 90 minutes | 240/680 | 239/690 | 213/616 | 239/665 | 236/655 |
| AFTER A 2 HOURS' "AGING" AT 127° C. AND 5.8 ATMOSPHERES OVERPRESSURE | | | | | |
| 45 minutes | 90 | 147 | 165 | 159 | 159 |
| 60 minutes | 48 | 106 | 144 | 147 | 118 |
| 90 minutes | 30 | 75 | 93 | 117 | 102 |
| AFTER A 3 DAYS' "AGING" IN A BIERER-DAVIS BOMB AT 60° C. AND AN OXYGEN PRESSURE OF 21 KGS. PER CM². | | | | | |
| 45 minutes | 114 | 195 | 201 | 201 | 207 |
| 60 minutes |  | 183 | 196 | 201 | 201 |
| 90 minutes |  | 166 | 160 | 179 | 177 |

*Example 2*

A mixture consisting of

| | Parts |
|---|---|
| A sodium polymerizate of butadiene | 100 |
| A mixture of equal parts of colophonium and caoutchol | 10 |
| Stearic acid diethyl amide | 5 |
| Zinc oxide | 15 |
| Active carbon black | 40 |
| Benzothiazolyl-2-sulfene diethyl amide | 1.5 |
| Sulfur | 1 | is divided into 5 parts. One of them has been vulcanized without the addition of an antiperishing agent (test 1). The remaining four parts are mixed each with 1% (calculated on the amount of polymerizate) of phenyl-β-naphthylamine (test 2), 2% of N-phenyl-N'-cyclohexyl-p-phenylene diamine (test 3), 1% of N-β-naphthyl-N'-cyclohexyl-p-phenylene diamine (test 4), 1% of N-phenyl-N'-cyclohexyl-p-phenylene diamine (test 5) and vulcanized for 60 minutes at 2 atmospheres overpressure in the mold. After a 5 days' exposure to air and sun tests 1 and 2 show distinct cracks, whereas in case of tests 3 to 5 much fewer cracks or no cracks at all are to be observed.

We claim:

1. N-phenyl-N'-cyclohexyl - p - phenylene diamine.
2. N-naphthyl-N'-cyclohexyl-p-phenylene diamine.
3. Compounds selected from the class consisting of N-phenyl-N'-cyclohexyl-p-phenylene diamine and N-naphthyl-N'-cyclohexyl-p-phenylene diamine.

MAX BÖGEMANN.
OTTO BAYER.
RUDOLF SCHRÖTER.
HANS POHLE.